July 9, 1963
L. M. KAYLER
3,096,787
INDEXING VALVES ADAPTABLE FOR USE IN LAWN SPRINKLING
SYSTEMS AND OTHER LIQUID DISTRIBUTION SYSTEMS
Filed July 10, 1961
2 Sheets-Sheet 2
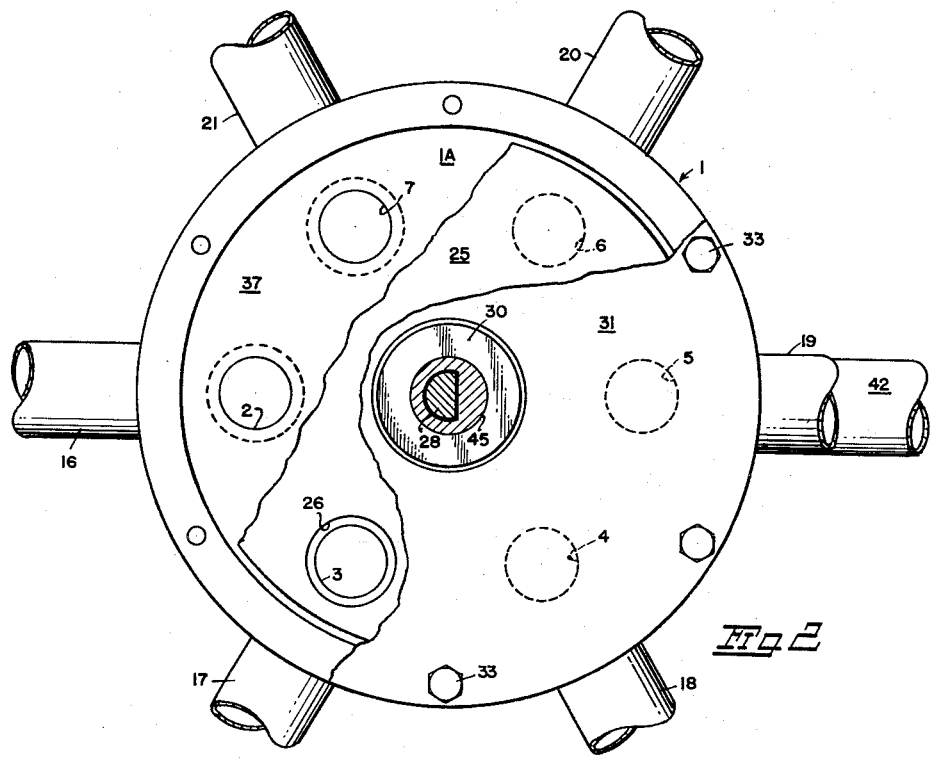
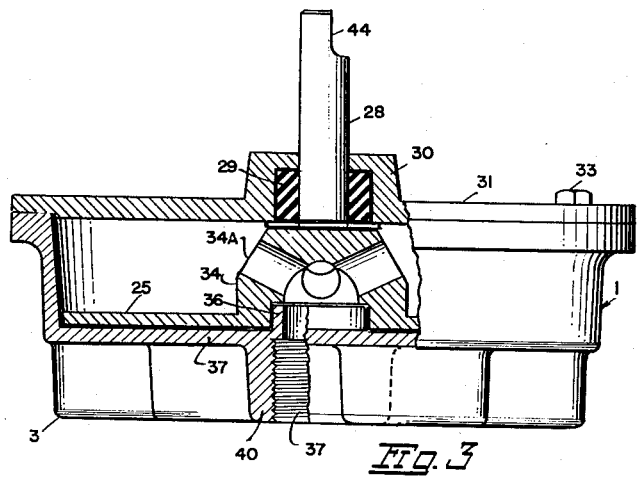
LLOYD M. KAYLER
*INVENTOR.*
BY James L. Girman
ATT'Y

United States Patent Office 3,096,787
Patented July 9, 1963

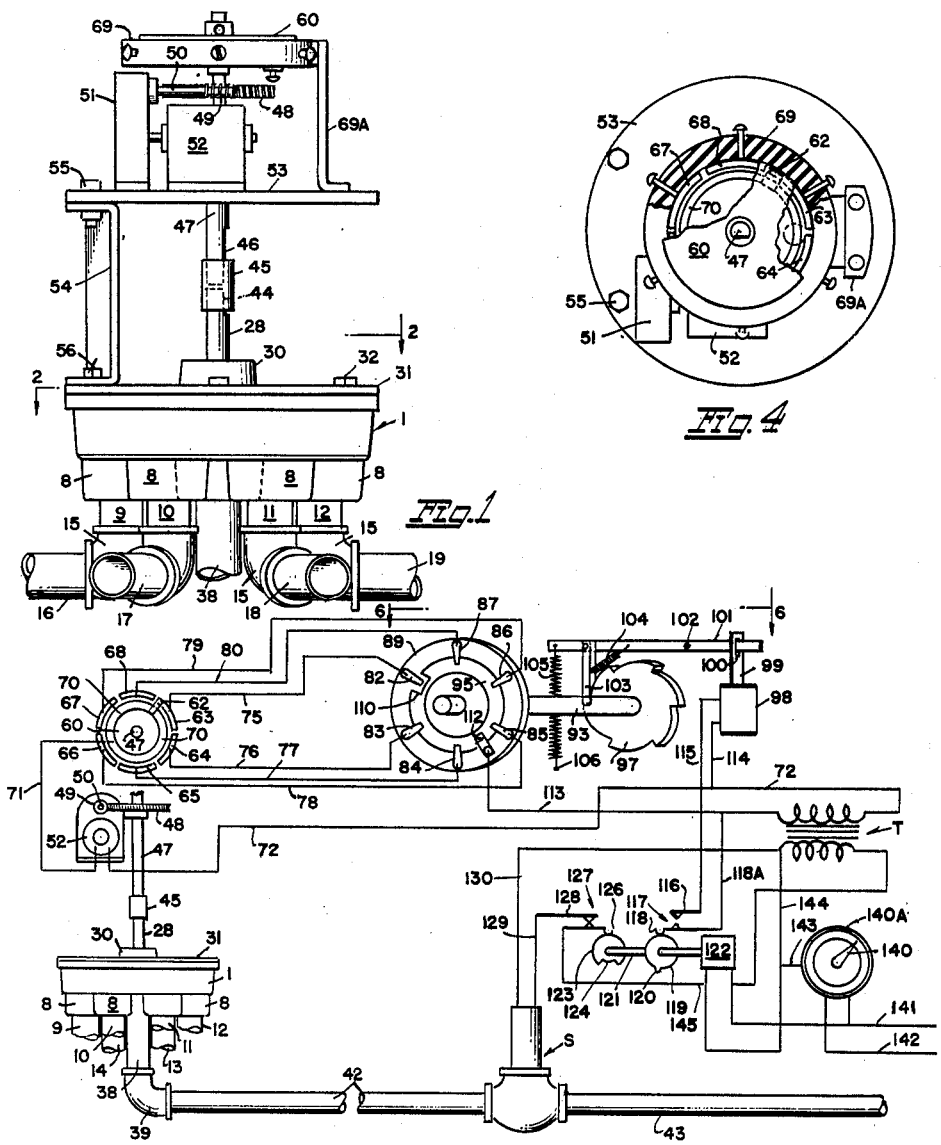

3,096,787
INDEXING VALVES ADAPTABLE FOR USE IN LAWN SPRINKLING SYSTEMS AND OTHER LIQUID DISTRIBUTION SYSTEMS
Lloyd M. Kayler, 3127 NE. Skidmore St., Portland, Oreg.
Filed July 10, 1961, Ser. No. 122,673
3 Claims. (Cl. 137—624.13)

This invention relates to improvements in fluid flow control valves particularly designed for incorporation into a timing system for intermittent selective operation.

One of the principal objects of the invention is to provide a disk valve and means for indexing the same progressively to a series of outlets to direct and maintain fluid flow therethrough for selected timed duration.

Another object is the inclusion of a selector and timing means remotely disposed from said valve and including indexing means associated with the valve for positive alignment of outlet ports with said outlets.

The foregoing and other objects and advantages which will become subsequently apparent reside in the details of construction and operation as more fully hereinafter described and claimed, reference being had to the accompanying drawings forming a part hereof and in which:

FIGURE 1 is a side elevational view of the valve and actuating means therefor made in accordance with my invention.

FIGURE 2 is a sectional top plan view on an enlarged scale taken approximately along the line 2—2 of FIGURE 1 with fragments broken away to reveal underlying ports.

FIGURE 3 is a side elevational view of FIGURE 2 with the distributor pipes removed and with fragments similarly broken away.

FIGURE 4 is a top plan view of FIGURE 1 with parts broken away.

FIGURE 5 is a diagrammatic view of the invention and electrical circuits used in conjunction therewith, and FIGURE 6 is a detail view of the mechanism shown in FIGURE 5 and contained between the lines 6—6 thereof.

With continuing reference to the drawings wherein like references of character designate like parts reference numeral 1 indicates generally a circular valve body having a plurality of circumferentially disposed outlet ports 2, 3, 4, 5, 6, and 7 in its bottom wall 1A surrounded by internally threaded bosses 8 into which are secured downwardly extending outlet pipes 9, 10, 11, 12, 13, and 14 connected at their bottom ends by elbows 15 with radially extending distributor pipes 16, 17, 18, 19, 20, and 21 respectively.

A valve disk 25 having a single outlet port 26 is rotatably mounted within the valve body 1 upon the bottom wall 1A thereof by means of a stem 28 rotatable and extending upwardly through a sealing gasket 29 and a central boss 30 on a closure plate 31 for the valve body and secured thereto by bolts 33. The valve disk 25 is provided with a hub 34 rotatable about an annular flange 36 integrated with the bottom wall 1A of the valve housing and defining an internally threaded inlet opening 37 in open communication with a fluid supply pipe 38 which is in open communication by means of an elbow 39 with one end of a fluid supply pipe 42 whose opposite end is connected with the outlet side of a solenoid valve S. The inlet side of the solenoid valve is in communication by means of a conduit 43 with a source of fluid pressure (not shown). The hub 34 of valve disc 25 is provided with radial ports 34A.

From the foregoing it will be readily apparent that fluid under pressure from the solenoid valve, when open, will flow into the valve housing and out through the distributor pipe with which the single outlet port 26 is in registry.

The top end of the valve stem 28 is truncated as at 44 for engagement with the bottom end of a sleeve coupling 45 within whose top end is engaged the truncated bottom end 46 of the shaft 47. The top end of this shaft is provided with a worm gear 48 meshing with and driven by a worm 49 secured to the output shaft 50 of a gear reduction mechanism 51 driven by a motor 52 mounted upon a platform 53 superimposed upon the closure 31 of the valve body by a supporting bracket 54 secured respectively as at 55 and 56 to the platform 53 and valve body closure 31.

The top end of the shaft 47 is provided with a rotatable member 60 (see FIGS. 1, 4, and 5) of dielectric material which carries a contact 62 adapted at its bottom end for progressive wiping contact with segments 63, 64, 65, 66, 67, and 68 secured within a circular housing 69 of a dielectric material (FIGS. 1 and 4) superimposed upon the platform 53 by a bracket 69A. A concentric conductor ring 70 (FIGS. 4 and 5) is disposed within the housing 69 in spaced relation to the segments 63–68 and connected by a wire 71 (FIG. 5) to one side of the motor 52 whose opposite side is connected by wire 72 to one side of a transformer T.

The bottom end of contact 62 is of sufficient width to be at all times in wiping contact with the conductor ring 70. The contact segments 63–68 are connected respectively by wires 75, 76, 77, 78, 79 and 80 to distributor contacts 82, 83, 84, 85, 86, and 87 secured to a ring of dielectric material 89.

The ring 89 is fixedly secured to one flange 90 (see FIG. 6) of a U-shaped member 91 which with the other flange 92 thereof rotatably supports a shaft 93 to whose one end is secured (FIG. 5) a second conductor ring 95 and intermediate its ends is secured a ratchet wheel 97. A solenoid 98 is mounted upon the member 91 and provided with a core of armature 99 having a slot 100 in its top end through which extends one end of a lever arm 101 pivotally mounted to the flange 92 as at 102 and provided near its opposite end with a pawl 103 held at all times in contact with the ratchet wheel 97 by a tension spring 104. To the outermost end of arm 101 is attached one end of a tension spring 105 whose opposite ends is attached as at 106 to the bracket 91.

The second conductor ring 95 (FIG. 5) is provided with a recess 110 to progressively open the circuit from the conductor ring 95 to the distributor contacts 82–87 as the ring is intermittently rotated by corresponding rotation of the ratchet wheel 97 by the shaft 93. A brush contact 112 is at all times in contact with the conductor ring 95 and connected by wire 113 to the transformer T. Also connected to the transformer by wires 114 and 72 is one side of the solenoid 98 whose opposite side is connected by wire 115 to a fixed contact 116 of a first cam switch indicated generally at 117 whose opposite or movable contact 118 is at all times in contact with a cam wheel 119 having a lobe 120 formed thereon and driven by a shaft 121 of a timer motor 122. Also secured to shaft 121 is a second cam wheel 123 of a second cam switch indicated generally at 127 having a recess 124 formed in its peripheral edge. At all times in contact with the cam wheel 123 is a movable contact 126 of the solenoid switch or second cam switch 127 whose other contact 128 is fixed and connected by wire 129 to one side of the solenoid S whose opposite side is connected by wire 130 to the transformer T.

The operation of the invention is as follows:

Energization of the operating circuit is timed by the setting of the hand 140 of a time clock 140A which is in circuit as at 141 and 142 with a source of electrical energy not shown.

One side of the clock is in circuit by wires 143 and 144 with one side of the transformer T. One side of the timer motor 122 is in circuit with one side of the source by wire 141 and its other side is in circuit through the clock by wire 143 with the other side of the source. Thus, when the circuit to the transformer is closed by the time clock 140A the timer motor will be put into operation as will the cams 119 and 123 by the motor shaft 121. In the positions shown in FIGURE 5 cam 123 is holding solenoid switch 127 closed and the solenoid valve S open to allow an uninterrupted flow of fluid through the pipes 43, 42, and 38 (FIG. 2) into the valve housing 1 and out through the port 26 and the outlet 3 with which the port 26 is in registry. Such flow will continue until the movable contact 126 of which 127 drops into and travels across the recess 124 of the cam 123, thus breaking the circuit to the solenoid valve S allowing it to close and stop pressure flow to the valve housing 1.

The duration of pressure flow may be varied, but let it be assumed that with cam 123 of the diameter shown the travel time of contact 126 in circuit closed position from one end of recess 124 around the cam to the other end of the recess is 5 minutes and its travel time across the recess is 1 minute, then intermittent progressive pressure flow out through the distribution pipes will endure for 5 minutes each with 1 minute intervals therebetween.

When contact 126 is crossing the recess 124, the lobe 120 of cam 119 rotated by motor shaft 121 will close switch 117 to energize the solenoid 98.

This energization of solenoid 98 and the resultant downward pull on its armature 99 at one end of the lever arm 101 will rock said arm about its pivot 102 to lift the opposite end of the arm against the reaction of the spring 105 and will also lift the pawl 103 for engagement of its bottom end with the next notch or lobe in the ratchet wheel 97 and such engagement will be insured by the inward pull of the spring 104. Upon deenergization of solenoid 98, by opening of switch 117 by the lobe 120 of cam 119, the downward pull of spring 105, through the medium of the pawl 103 so engaged, will sufficiently rotate the ratchet wheel 97, shaft 93, and conductor ring 95 in a counterclock-wise direction as viewed in FIGURE 5 to close the circuit from one side of the transformer T, through brush contact 112, ring 95, contact 82, wire 75, contact segment 63, contact 62, conductor ring 70, wire 71 to one side of motor 52 and from the other side of said motor through wire 72 to the other side of the transformer T. The motor 52 now being energized will operate for one minute to move contact 62 from the position shown to the opposite end of contact segment 63 and at the same time rotate valve disk 25 to position the outlet portion 26 therein in registry for example with the next outlet port 4 in the bottom wall of the valve body in which position the disk will be held by breakage of the circuit to motor 52 when contact 62 leaves the end of contact segment 63 and makes contact with the adjacent end of contact segment 64 where it will remain for five minutes until the ring 95 is again actuated by the time motor 122, solenoid 98, ratchet wheel 97, and related parts until, by this further rotation of ring 95, the circuit will be closed through contact 83 and to contact segment 64. These sequential cycles of operation will continue as long as the time clock 140A is in operation.

Breaking the circuit to solenoid S by the opening of solenoid switch 127 and the closing of the solenoid valve to thus cut fluid pressure to the interior of the distributor valve housing 1 for the one-minute interval is an important feature of the invention since the absence of such pressure permits rotation of the valve disk 25.

Thus it will be seen that fluid under pressure will flow out through the distribution pipes 16 to 21 for five minutes each and fluid flow will be stopped for one minute to allow the motor 52 to rotate valve disk 25 and advance the outlet portion 26 therein from one valve body outlet to the next.

While I have shown and described a particular form of embodiment of my invention, I am aware that many minor changes therein will readily suggest themselves to others skilled in the art without departing from the spirit and scope of the invention. Having thus described my invention what I claim as new and desire to protect by Letters Patent is:

1. An indexing valve and fluid distribution system, said valve comprising a hollow circular valve housing having a top wall and a bottom wall, said bottom wall having a plurality of radially disposed outlets therein, fluid distribution pipes radiating from said housing and in open communication with said outlets, a valve disk rotatably mounted within said housing having a single outlet port therein and a vertical stem rotatably extending through said top wall, a fluid pressure supply line in open communication through said bottom wall and the center of said valve disk with the interior of the valve housing, selector switch means and distributor switch means, motor means operatively connected to said valve stem for intermittently rotating said disk and said selector switch means and in circuit through said selector switch means and through said distributor switch means with a source of electrical current, a timer motor in circuit through an electrical timer with said current source, a first cam-actuated switch and a second cam-actuated switch both operable by said timer motor, a solenoid valve within said pressure supply line for supplying fluid pressure to the interior of said valve housing at timed intervals, said solenoid valve in circuit with said source through one of said cam-actuated switches, a solenoid for imparting progressive intermittent operation to said distributor switch means and in circuit through the other said second cam-actuated switch with said source, both of said cam switches operable in unison by said timer motor and so related that when the first cam switch is closed by its respective cam to cause rotation of said distributor switch, the cam of the second cam switch will open the same to close said solenoid valve for a period of time approximately equal to the time required for said valve disk to be rotated by said motor means from one position to the next whereby operation of said motor means will actuate said selector switch and rotate said valve disk to advance said single outlet port therein from registry with one of said radially disposed outlets into registry with another and whereby closure of said solenoid valve by the opening of said second cam-actuated switch to relieve fluid pressure within the valve housing to permit of said valve disk rotation while closure of said first cam switch will actuate said distributor switch and said selector switch and said motor means.

2. An indexing valve and fluid distribution system,
said valve comprising a circular valve housing having a plurality of radially disposed outlets in its bottom wall,
fluid distribution pipes radiating from said housing and in open communication with said outlets,
a valve disk rotatably mounted within said housing and having a single outlet port therein adapted for progressive intermittent registry with said outlets,
a fluid pressure supply line in open communication through said bottom wall and the center of said valve disk with the interior of the valve housing,
a solenoid valve within said pressure supply line for supplying fluid pressure to the interior of said valve housing at timed intervals,
a first motor means for imparting intermittent rotation to said valve disk,
a second motor means in circuit through a time clock with a source of electrical energy,
said first motor means having one of its sides in circuit with one side of the said source and its other side in circuit through selector switch means and distributor switch means with said source, a first cam switch and a second cam switch operable in unison by said second motor means, means operable by said second cam switch for energizing said solenoid valve to open the same to provide fluid pressure to the interior of said valve housing, means operable by said first cam switch to energize said second motor means upon deenergization of said solenoid valve by said second cam switch for imparting progressive closing of electrical circuits through said distributor switch means and said selector switch means to said first motor means to thereby impart progressive intermittent rotation of said valve disk during the absence of fluid flow into said valve housing and progressive distribution of fluid through said distribution pipes for timed intervals upon energization of said solenoid valve by said second cam switch to open said solenoid valve.

3. An indexing valve and fluid distribution system, said valve comprising a hollow circular valve housing having a top wall and a bottom wall, said bottom wall having a plurality of radially disposed outlets therein, fluid distribution pipes radiating from said housing and in open communication with said outlets, a valve disk rotatably mounted within said housing having a single outlet port therein and a vertical stem rotatably extending through said top wall, a fluid pressure supply line in open communication through said bottom wall and the center of said valve disk with the interior of the valve housing, a rotatable selector switch and a rotatable distributor switch, electrical connections between both of said switches for intermittent transmission of electrical energy from the distributor switch to the selector switch, motor means in circuit with said selector switch and operatively connected to said valve stem for intermittently rotating said disk and said selector switch, said motor means in circuit through said selector switch and through said distributor switch with a source of electrical current, a timer motor in circuit through an electrical timer with said current source, a first cam-actuated switch and a second cam-actuated switch both operable in unison by said timer motor, a solenoid valve within said pressure supply line for supplying fluid pressure to the interior of said valve housing at timed intervals, said solenoid valve in circuit with said source through said second cam-actuated switch, a solenoid for imparting progressive intermittent rotation to said distributor switch and in circuit through the first cam-actuated switch with said source, said cam-actuated switches so related that when the first cam switch is closed by its respective cam to cause rotation of said distributor switch the cam of the second cam switch will open the same to close said solenoid valve to stop fluid flow to the interior of said valve body for a period of time approximately equal to the time required by said valve disk to be rotated by said motor means from one position to the next upon closure of said first cam-actuated switch whereby operation of said motor means upon closure of the circuit through said electrical timer, and said distributor switch will actuate said selector switch and said motor means to rotate said valve disk to advance said single outlet port therein from registry with one of said radially disposed outlets into registry with another and whereby closure of said solenoid valve by the opening of said second cam-actuated switch will relieve fluid pressure within the valve housing to permit of said valve disk rotation.

References Cited in the file of this patent
UNITED STATES PATENTS

| | | |
|---|---|---|
| 2,740,081 | McKay | Mar. 27, 1956 |
| 2,945,169 | Carr | July 20, 1960 |
| 3,008,490 | Angelos | Nov. 14, 1961 |